(12) United States Patent
Gomi (10) Patent No.: US 10,843,386 B2
(45) Date of Patent: Nov. 24, 2020

(54) SHEET MANUFACTURING APPARATUS AND SHEET MANUFACTURING METHOD

(71) Applicant: SEIKO EPSON CORPORATION, Tokyo (JP)

(72) Inventor: Katsuhito Gomi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 567 days.

(21) Appl. No.: 15/023,000

(22) PCT Filed: Jun. 24, 2014

(86) PCT No.: PCT/JP2014/003389
§ 371 (c)(1),
(2) Date: Mar. 18, 2016

(87) PCT Pub. No.: WO2015/059846
PCT Pub. Date: Apr. 30, 2015

(65) Prior Publication Data
US 2016/0229093 A1      Aug. 11, 2016

(30) Foreign Application Priority Data
Oct. 21, 2013   (JP) ................. 2013-218101

(51) Int. Cl.
| | |
|---|---|
| *B29C 43/24* | (2006.01) |
| *B29D 7/01* | (2006.01) |
| *D04H 1/54* | (2012.01) |
| *B27N 3/24* | (2006.01) |
| *D04H 1/732* | (2012.01) |
| *D04H 1/60* | (2006.01) |

(52) U.S. Cl.
CPC ............... *B29C 43/24* (2013.01); *B27N 3/24* (2013.01); *B29D 7/01* (2013.01); *D04H 1/54* (2013.01); *D04H 1/60* (2013.01); *D04H 1/732* (2013.01)

(58) Field of Classification Search
CPC . B29C 43/24; B29D 7/01; B27N 3/24; D04H 1/60; D04H 1/54; D04H 1/732
See application file for complete search history.

(56) References Cited

U.S. PATENT DOCUMENTS

| | | | | |
|---|---|---|---|---|
| 3,880,975 | A | * | 4/1975 | Lundmark ............... B27N 3/08 264/119 |
| 5,887,511 | A | | 3/1999 | Cappellotto |
| 8,882,965 | B2 | | 11/2014 | Yamagami et al. |
| 9,194,081 | B2 | | 11/2015 | Yamagami |
| 9,435,078 | B2 | | 9/2016 | Yamagami et al. |

(Continued)

FOREIGN PATENT DOCUMENTS

| | | |
|---|---|---|
| CN | 201553878 U | 8/2010 |
| CN | 102146616 A | 8/2011 |

(Continued)

*Primary Examiner* — Robert J Grun
(74) *Attorney, Agent, or Firm* — Global IP Counselors, LLP (57) ABSTRACT

A sheet manufacturing apparatus includes a web forming unit that forms a web in which at least fiber and resin are deposited in the air; a pressing unit that presses the web; and a heating and pressing unit that heats and presses the web on a further downstream side than the pressing unit in a transport direction of the web, in which a pressing force of the pressing unit is greater than a pressing force of the heating and pressing unit.

7 Claims, 3 Drawing Sheets

(56) References Cited

U.S. PATENT DOCUMENTS

| | | | |
|---|---|---|---|
| 9,636,847 B2 | 5/2017 | Yamagami et al. | |
| 9,890,499 B2 | 2/2018 | Yamagami | |
| 2002/0033235 A1* | 3/2002 | Maes | B32B 37/0053 156/555 |
| 2012/0070626 A1* | 3/2012 | Battis | B27N 3/00 428/192 |
| 2013/0220541 A1* | 8/2013 | Fujiwara | B29C 43/28 156/324 |
| 2014/0027075 A1 | 1/2014 | Yamagami et al. | |
| 2014/0374047 A1 | 12/2014 | Yamagami | |
| 2016/0010278 A1 | 1/2016 | Yamagami et al. | |
| 2016/0332333 A1 | 11/2016 | Yamagami et al. | |
| 2017/0198434 A1 | 7/2017 | Yamagami | |

FOREIGN PATENT DOCUMENTS

| | | |
|---|---|---|
| JP | 52-144407 A | 12/1977 |
| JP | 08-049513 A | 2/1996 |
| JP | 09-216209 A | 8/1997 |
| JP | 2001-113509 A | 4/2001 |
| JP | 2011-113509 A | 6/2011 |
| WO | 2012/095928 A1 | 7/2012 |

\* cited by examiner

SHEET MANUFACTURING APPARATUS AND SHEET MANUFACTURING METHOD

TECHNICAL FIELD

The present invention relates to a sheet manufacturing apparatus and a sheet manufacturing method.

BACKGROUND ART

In the related art, a nonwoven fabric manufacturing apparatus including a far infrared ceramic heater that heats a formed web and a pair of calendar rollers that heats and presses the web that is heated by the far infrared ceramic heater is known (for example, see PTL 1).

CITATION LIST

Patent Literature

PTL 1: Japanese Unexamined Patent Application Publication No. 8-49153

SUMMARY OF INVENTION

Technical Problem

However, the above-described nonwoven fabric manufacturing apparatus is configured such that the web is heated by the far infrared ceramic heater before pressing the web by the calendar rollers. In this case, if the web is heated before being pressed, resin is melted and bound between fibers in a state where the fibers configuring the web are not sufficiently compressed. Then, the web is established in a form of a state of insufficient density and even if the web is pressed thereafter, the form cannot be broken. Thus, there is a problem that sufficient density or strength cannot be ensured in a manufactured sheet.

Solution to Problem

The invention is made to solve at least a part of the above-described problems and can be realized in the following aspects or application examples.

APPLICATION EXAMPLE 1

According to this application example, there is provided a sheet manufacturing apparatus including a web forming unit that forms a web in which at least fiber and resin are deposited in the air; a pressing unit that presses the web without heating the web; and a heating and pressing unit that heats and presses the web on a further downstream side than the pressing unit in a transport direction of the web. A pressing force of the pressing unit is greater than a pressing force of the heating and pressing unit.

In this case, first, the web that is formed by depositing the fiber and resin is pressed. When pressing the web, the web is not heated and is only pressed. A distance between the fibers configuring the web is shortened by pressing. Next, the web is heated and pressed in a state where the distance between the fibers is shortened. Thus, resin is melted and the fibers are bonded in a state where the distance between the fibers is shortened while preventing springback of the web. Thus, it is possible to form a sheet having high density and high strength.

APPLICATION EXAMPLE 2

In the sheet manufacturing apparatus according to the above application example, the pressing unit may have at least a pair of pressing rollers for pressing the web by pinching the web by the pair of the rollers, and the heating and pressing unit may have at least a pair of heating and pressing rollers for heating and pressing the web by pinching the web by the pair of the rollers.

In this case, it is possible to shorten a time from pressing to heating by using the pressing rollers and the heating and pressing rollers more than a case where one of the pressing rollers and the heating and pressing rollers is a flat press and it is possible to heat the web before the springback occurs by pressing. For example, a case of the flat press, a distance between a leading end of the web and the heating unit is short, but a distance between a trailing end of the web and the heating unit is long. In addition, the time from pressing to heating can be constant. Thus, it is possible to suppress unevenness of pressing or heating.

APPLICATION EXAMPLE 3

In the sheet manufacturing apparatus according to the above application example, a diameter of the pressing roller may be greater than a diameter of the heating and pressing roller.

In this case, a state where the web is formed in the air is a state where the fiber and resin are mixed and a state where the web contains a lot of air and is soft, and inflated. Thus, it is possible to efficiently transport the web by reliably catching the web of the inflated state by making the diameter of the pressing roller be greater than the diameter of the heating and pressing roller, that is, by making the diameter of the pressing roller disposed on an upstream side in the transport direction of the web be greater than the diameter of the heating and pressing roller. On the other hand, since the web that is pressed once is fixed in shape, there is no problem even when the diameter of the heating and pressing roller disposed on the downstream side in the transport direction of the web is smaller than that of the pressing roller. Thus, it is possible to improve transportability of the web and to reduce a size of an apparatus configuration.

APPLICATION EXAMPLE 4

In the sheet manufacturing apparatus according to the above application example, a member that is able to come into contact with the web between the pressing rollers and the heating and pressing rollers may be only a web receiving member that is able to receive the web from below.

In this case, since only the receiving member for receiving the web that hangs down is provided between the pressing rollers and the heating and pressing rollers, it is possible to reduce a distance between the pressing rollers and the heating and pressing rollers. Thus, the heated web is quickly heated and pressed. Therefore, the springback of the web is suppressed and it is possible to form a sheet having high density and high strength.

APPLICATION EXAMPLE 5

According to this application example, there is provided a sheet manufacturing method including a step of forming a web in which at least fiber and resin are deposited in the air; a step of pressing the web without heating; and a step of heating the web for heating and pressing the web after the step of pressing the web. A pressing force in the step of pressing is greater than a pressing force in the step of heating and pressing.

In this case, first, the web that is formed by depositing the fiber and resin is pressed. When pressing the web, the web is not heated and is only pressed. A distance between the fibers configuring the web is shortened by pressing. Next, the web is heated and pressed in a state where the distance between the fibers is shortened. Thus, resin is melted and the fibers are bonded in a state where the distance between the fibers is shortened while preventing springback of the web. Thus, it is possible to form the sheet having high density and high strength.

APPLICATION EXAMPLE 6

According to this application example, there is provided a sheet manufacturing apparatus including a web forming unit that forms a web in which at least fiber and resin are deposited in the air; a pressing unit that presses the web at 51 N to 306 N; and a heating and pressing unit that heats and presses the web on a further downstream side than the pressing unit in a transport direction of the web.

DESCRIPTION OF EMBODIMENTS

Hereinafter, an embodiment of the invention will be described with reference to the drawings. Moreover, in each view described below, in order to make each member and the like be recognizable sizes, scales of each member and the like are different from actual sizes.

First, a configuration of a sheet manufacturing apparatus will be described. In addition, a sheet manufacturing method will be described together. The sheet manufacturing apparatus is, for example, based on a technique of forming a new sheet Pr using a raw material (defibration object) Pu such as pure pulp sheet and waste paper. The sheet manufacturing apparatus according to the embodiment is configured to include a web forming unit that forms a web in which at least fiber and resin are deposited in the air; a pressing unit that presses the web without heating the web; and a heating and pressing unit that heats and presses the web on a further downstream side than the pressing unit in a transport direction of the web, and in which a pressing force of the pressing unit is greater than a pressing force of the heating and pressing unit. A sheet manufacturing method of the embodiment includes a web forming step of forming a web in which at least fiber and resin are deposited in the air; a pressing step of pressing the web; and a heating step of heating and pressing the web after the pressing step, in which a pressing force in the pressing step is greater than a pressing force in the heating and pressing step. Moreover, the web according to the embodiment refers to a configuration form of an object containing the fiber and resin. Thus, even if forms such as dimensions are changed during heating, during pressing, during cutting, or during transporting the web, it illustrates as the web and details will be described below.

Figure 1:
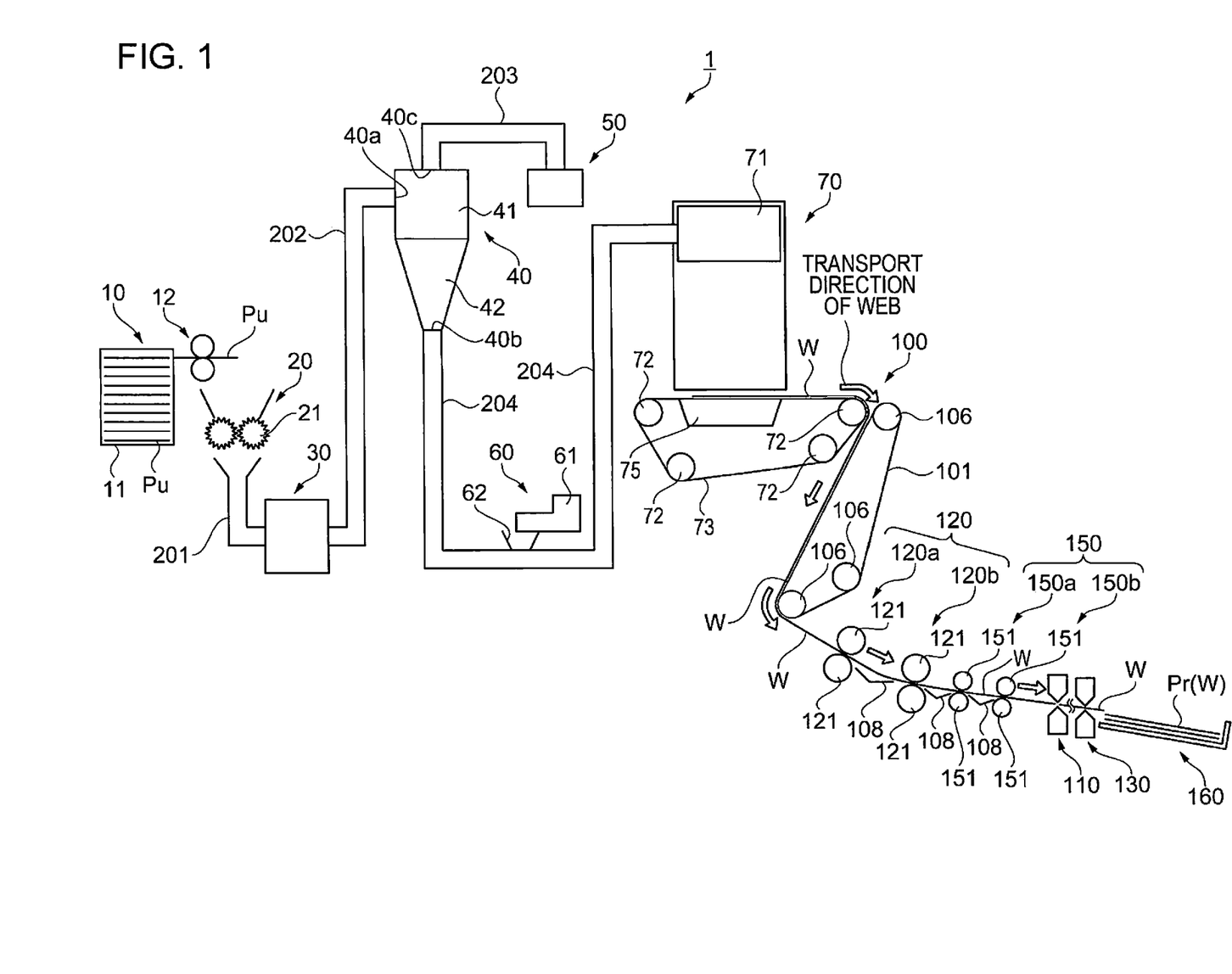
FIG. 1 is a schematic view illustrating a configuration of a sheet manufacturing apparatus.
Figure 2:
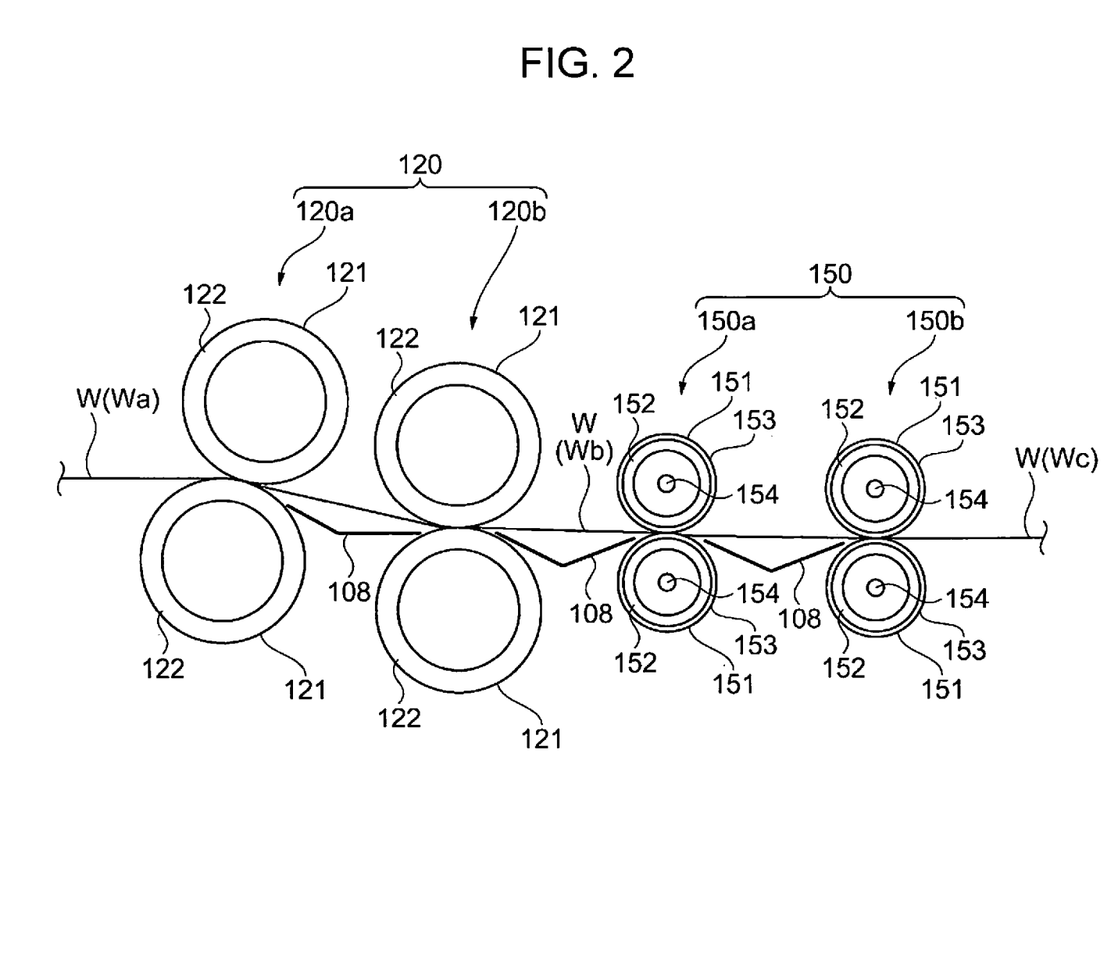
FIG. 2 is a schematic view illustrating a configuration of a part of the sheet manufacturing apparatus.
Figure 3:
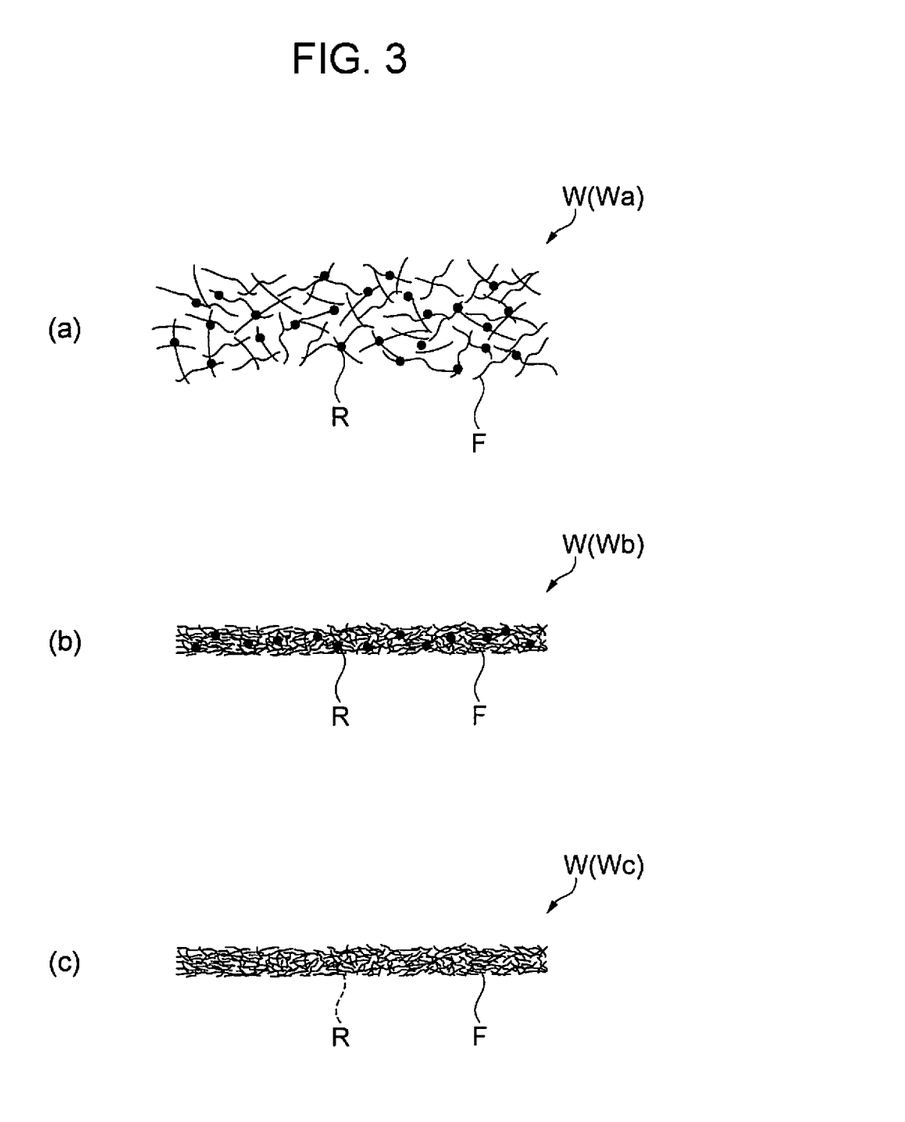
FIG. 3 is a schematic diagram illustrating a sheet manufacturing method.

FIG. 1 is a schematic view illustrating the configuration of the sheet manufacturing apparatus according to the embodiment and FIG. 2 is a schematic view illustrating a configuration of a part of the sheet manufacturing apparatus. In addition, FIG. 3 is a schematic diagram illustrating the sheet manufacturing method. First, as illustrated in FIG. 1, a sheet manufacturing apparatus 1 includes a supplying unit 10, a crushing unit—20, a defibrating unit 30, a classifying unit 40, a receiving unit 50, an additive agent feeding unit 60, a web forming unit 70, a pressing unit 120, a heating and pressing unit 150, and the like.

The supplying unit 10 supplies the waste paper Pu to the crushing unit 20. The supplying unit 10 includes, for example, a tray 11 in which a plurality of the waste papers Pu are deposited by overlapping the waste papers Pu, an automatic feeding mechanism 12 that is capable of continuously feeding the waste papers Pu in the tray 11 into the crushing unit 20, and the like. The waste paper Pu supplied to the sheet manufacturing apparatus is, for example, paper of A4 size and the like mainly used in an office.

The crushing unit 20 is provided to cut out the supplied waste paper Pu to pieces of paper of several centimeters square. The crushing unit 20 includes crushing blades 21 and configures a device for spreading cut widths of blades of a conventional shredder. Thus, it is possible to easily cut out the supplied waste paper Pu to the pieces paper. Then, cut crushed papers are supplied to the defibrating unit 30 through a pipe 201.

The defibrating unit 30 includes rotating blades (not illustrated) and untangles (defibrates) the crushed papers supplied from the crushing unit 20 in fibriform. In addition, the defibrating unit 30 of the embodiment performs defibration in the air in dry type. Coating materials to the paper such as blur-preventing agent, ink, and toner to be printed are separated from the fiber by being particles (hereinafter, referred to as "ink particles") of several tens of μm or less by the defibrating process of the defibrating unit 30. Thus, the defibrated material drawn out from the defibrating unit 30 is fiber and the ink particles obtained by defibration of the pieces of paper. Then, a mechanism of generating airflow by rotation of the rotary blades is provided and the defibrated fiber is transported to the classifying unit 40 through a pipe 202 by riding on the airflow. Moreover, if a dry type defibrating unit 30 that does not include a wind generation mechanism is used, an airflow generating device for generating the airflow from the crushing unit 20 to the defibrating unit 30 may be separately provided.

The classifying unit 40 classifies the defibrated material into the ink particles and the fiber. In the embodiment, as the classifying unit 40, a cyclone (hereinafter, the cyclone 40 is described as the classifying unit) is applied and the transported fiber is classified into the ink particles and a deinked fiber (deinked defibrated material) using the airflow. Moreover, another airflow type classifier may be used instead of the cyclone 40. In this case, as the airflow type classifier other than the cyclone 40, for example, elbow jet, eddy classifier, and the like are used. The airflow type classifier generates a whirling airflow, separates, and classifies the defibrated material by a difference in a centrifugal force received by a size and density of the defibrated material. Thus, it is possible to adjust a classification point by adjusting a speed of the airflow and the centrifugal force. Thus, the defibrated material is separated into small ink particles of relatively low density and the fiber of high density having particles greater than the ink particles in size. Removing the ink particles from the fiber is referred to as deinking.

Moreover, for the cyclone 40, a tangent input type cyclone has a relatively simple structure. The cyclone 40 of the embodiment is configured of an inlet 40a through which the introduced material is introduced from the defibrating unit 30, a cylindrical unit 41 to which the inlet 40a is attached in a tangent direction, a conical unit 42 following a lower portion of the cylindrical unit 41, a lower outlet 40b provided in a lower portion of the conical unit 42, and an upper air outlet 40c for discharging fine powder provided in an upper center of the cylindrical unit 41. A diameter of the conical unit 42 is decreased going downward in a vertical direction.

In a classifying process, the airflow, on which the defibrated material introduced from the inlet 40a of the classifying unit 40 rides, is changed to a circumferential movement in the cylindrical unit 41, entanglement of the fiber is increased by applying the centrifugal force and synergy with the airflow, and the defibrated material moves to the conical unit 42. In addition, separated ink particles are delivered to the upper air outlet 40c together with air as fine powder, and deinking is processed. A short fiber mixture containing a large amount of the ink particles is discharged from the upper air outlet 40c of the cyclone 40. Then, the discharged short fiber mixture containing a large amount of the ink particles is recovered in the receiving unit 50 through a pipe 203 connected to the upper air outlet 40c of the cyclone 40. On the other hand, the deinked fiber is transported from the lower outlet 40b of the cyclone 40 to the web forming unit 70 through a pipe 204. Moreover, a suction mechanism for forcibly sucking the short fiber mixture containing a large amount of the ink particles may be provided on the upper air outlet 40c side.

In addition, the additive agent feeding unit 60 for adding the additive agent such as resin (for example, fusion-bondable resin or thermosetting resin) to the transported deinked fiber is provided in the middle of the pipe 204 in which the deinked fiber is transported from the cyclone 40 to the web forming unit 70. Moreover, as the additive agent, for example, flame retardant, colorant, a sheet strength enhancing agent, a sizing agent, and the like may also be fed in addition to the fusion-bondable resin. The additive agent is stored in an additive agent reservoir 61 and is fed from a feeding port 62 by a feeding mechanism (not illustrated).

The web forming unit 70 is provided to form the web in which at least the fiber and resin fed from the pipe 204 are stacked in the air (corresponding to web forming step). The web forming unit 70 has a mechanism for uniformly dispersing the fibers in the air and a mechanism for depositing the dispersed fibers on a mesh belt 73.

First, as the mechanism for uniformly dispersing the fibers in the air, a forming drum 71 into which the fiber and resin are fed is disposed in the web forming unit 70. Then, it is possible to uniformly mix resin (additive agent) in the fibers by driving the forming drum 71 to be rotated. A screen having a plurality of small holes is provided on a surface of the forming drum 71. In addition, a rotatable needle roll is provided on an inside of the forming drum 71 and dissolves the fed fibers. It is possible to uniformly disperse the fibers passing through the small holes in the air by such a configuration.

On the other hand, the endless mesh belt 73 on which a mesh tensioned by tension rollers 72 (four tension rollers 72 in the embodiment) is formed is disposed below the forming drum 71. Then, the mesh belt 73 is moved in one direction by rotating at least one of the tension rollers 72.

Furthermore, a suction device 75 is provided vertically below the forming drum 71 as a suction unit for generating the airflow vertically downward through the mesh belt 73. It is possible to suck the fibers dispersed in the air on the mesh belt 73 by the suction device 75.

Then, if the fibers of an entangled state are introduced from the cyclone 40 into the forming drum 71 of the web forming unit 70, the fiber and resin are untangled by the needle roll and the like. Then, the untangled fibers pass through the small hole screen on the surface of the forming drum 71 and are deposited on the mesh belt 73 by a suction force by the suction device 75. In this case, it is possible to form a web W in which the fiber and resin are deposited in an elongated shape by moving the mesh belt 73 in one direction. A continuous web W is formed by dispersing the web W from the forming drum 71 and continuously performing the movement of the mesh belt 73. Moreover, the mesh belt 73 may be made of metal, resin, or nonwoven fiber if the fibers can be deposited on the mesh belt 73 and the airflow can pass through the mesh belt 73. Moreover, if the hole diameter of the mesh of the mesh belt 73 is too large, the fibers enter between the meshes and become unevenness when forming the web (sheet), and if the hole diameter of the mesh is too small, it is difficult to form stable airflow by the suction device 75. Thus, it is preferable that the hole diameter of the mesh is appropriately adjusted. The suction device 75 forms a closed box in which a window having a desired size is opened below the mesh belt 73 and can be configured to make an inside of the box be a negative pressure more than the outside air by sucking air from outside the window.

As described above, the fiber F and resin R are mixed and the web W (Wa) of a state of containing a lot of air and being soft, and inflated is formed by passing through the web forming unit 70 (web forming step) as illustrated in FIG. 3(a).

Next, as illustrated in FIG. 1, the web W formed on the mesh belt 73 is transported in the transport direction (arrows in the view) by rotation of the mesh belt 73. Next, the web W is transferred from the mesh belt 73 to a transport belt 101 that is tensioned by tension rollers 106, and is transported in the transport direction (arrows in the view).

The pressing unit 120 is disposed on a downstream side of the transport belt 101 in the transport direction of the web W. The pressing unit 120 is provided to press the web W without heating the formed web W (corresponding to pressing step). Thus, a heating unit such as a heater is not provided in the pressing unit 120. Thus, it is possible to increase density and improve strength of the web W by pressing (compressing) the web W. The pressing unit 120 is configured so as to press the web W by pinching the web W by rollers and has a pair of pressing rollers 121. Central axes of the pair of the pressing rollers 121 are parallel to each other. Moreover, the pressing unit 120 of the embodiment includes a first pressing unit 120a that is disposed on an upstream side in the transport direction of the web W and a second pressing unit 120b that is disposed on a downstream side thereof. The first pressing unit 120a and the second pressing unit 120b respectively include the pair of the pressing rollers 121. In addition, a guide 108 for assisting the transport of the web W is disposed between the first pressing unit 120a and the second pressing unit 120b.

As illustrated in FIG. 2, the pressing roller 121 is configured of a hollow metal core 122 made of aluminum, iron, stainless steel, and the like. Moreover, anti-rust treatment such as electroless nickel plating or triiron tetraoxide coating, a tube containing fluorine such as tetrafluoroethylene-perfluoroalkyl vinyl ether copolymer (PFA) or polytetrafluoroethylene (4 fluoride) (PTFE), or a release layer of fluorine coating such as PTFE may be formed on a surface of a heating and pressing roller 151. In addition, an elastic layer formed of silicone rubber, urethane rubber, cotton, or the like may be provided between the metal core 122 and the surface layer. The pair of the pressing rollers 121 that come into press-contact with each other with high load by providing the elastic layer can uniformly come into contact with each other in the axial direction of the pressing roller 121.

As described above, since the web W (Wa) fed into the pressing unit 120 is only pressed without heating by passing through the pressing unit 120 (pressing step), as illustrated in FIG. 3(b), resin R is not melted and a gap (distance) between the fibers F is shortened. That is, the web W (Wb) having high density is formed.

As illustrated in FIG. 1, the heating and pressing unit 150 is disposed on further the downstream side than the pressing unit 120 in the transport direction of the web W. The heating and pressing unit 150 is provided to heat and press the web W that is pressed by the pressing unit 120 (corresponding to heating and pressing step). Then, it is possible to bond the fibers contained in the web W together through resin by heating and pressing the web. The heating and pressing unit 150 is configured so as to heat and press the web W by pinching the web W by the rollers and has a pair of heating and pressing rollers 151. Central axes of the pair of the heating and pressing rollers 151 are parallel to each other. It is possible to form the sheet while continuously transporting the web by configuring the heating and pressing unit 150 as the heating and pressing rollers 151 compared to a case where the heating and pressing unit 150 is configured as a flat press device. In addition, if the flat press device is used, it is necessary to have a buffer unit for temporarily loosening the transporting web while pressing the web. That is, if the heating and pressing roller 151 is used, it is possible to improve manufacturing efficiency and to reduce a size of an entire configuration of the sheet manufacturing apparatus 1.

The heating and pressing unit 150 includes a first heating and pressing unit 150a disposed on the upstream side and a second heating and pressing unit 150b on the downstream side in the transport direction of the web W. The first heating and pressing unit 150a and the second heating and pressing unit 150b respectively include a pair of the heating and pressing rollers 151. In addition, a guide 108 for assisting the transport of the web W is disposed between the first heating and pressing unit 150a and the second heating and pressing unit 150b.

As illustrated in FIG. 2, the heating and pressing roller 151 is configured of a hollow metal core 152 made of aluminum, iron, stainless steel, and the like. Moreover, a tube containing fluorine such as tetrafluoroethylene-perfluoroalkyl vinyl ether copolymer (PFA) or polytetrafluoroethylene (4 fluoride) (PTFE) or a release layer 153 of fluorine coating such as PTFE is provided on a surface of the heating and pressing roller 151. In addition, an elastic layer formed of silicon rubber, urethane rubber, cotton, or the like may be provided between the metal core 152 and the release layer 153. The pair of the heating and pressing rollers 151 that come into press-contact with each other with high load by providing the elastic layer can uniformly come into contact with each other in the axial direction of the heating and pressing roller 151.

In addition, a heating member 154 such as a halogen heater is provided in a center portion of the metal core 152 as a heating unit. Each temperature of the heating and pressing roller 151 and the heating member 154 is obtained by a temperature detection unit (not illustrated) and driving of the heating member 154 is controlled based on the obtained temperature. Thus, it is possible to maintain a surface temperature of the heating and pressing roller 151 at a predetermined temperature. Then, it is possible to heat and press the transporting web W by allowing the web W to pass through between the heating and pressing rollers 151. Moreover, the heating unit is not limited to the halogen heater and, for example, a heating unit using a non-contact heater or a heating unit using hot air may be used.

As described above, resin R is melt and easily entangles with the fiber F, and the fibers F are bonded in a state where the gap between the fibers F is shortened by passing through the heating and pressing unit 150 (heating and pressing step). Thus, as illustrated in FIG. 3(c), the web W (Wc) having high density and high strength is formed.

As described above, in the embodiment, the pressing unit 120 (the first pressing unit 120a and the second pressing unit 120b) and the heating and pressing unit 150 (the first heating and pressing unit 150a and the second heating and pressing unit 150b) are provided. Here, a pressing force of the pressing unit 120 is greater than a pressing force of the heating and pressing unit 150. In other words, it is configured to strongly press the web W before heating the web W. For example, the pressing force of the pressing unit 120 can be set to be 51 N to 306 N (500 kgf to 3000 kgf) and the pressing force of the heating and pressing unit 150 can be set to be 3.1 N to 20.4 N (30 kgf to 200 kgf). As described above, since the pressing force of the pressing unit 120 is greater than that of the heating and pressing unit 150, it is possible to sufficiently reduce a distance between the fibers contained in the web W by the pressing unit 120 and to form the web W (sheet Pr) having high density and high strength by heating and pressing the web W in this state.

In addition, a diameter of the pressing roller 121 is set to be greater than a diameter of the heating and pressing roller 151. In other words, the diameter of the pressing roller 121 that is disposed on the upstream side is greater than the diameter of the heating and pressing roller 151 that is disposed on the downstream side in the transport direction of the web W. Since the diameter of the pressing roller 121 is great, it is possible to efficiently transport the web W by catching the web W of a state of not being compressed yet. On the other hand, the web W passing through the pressing roller 121 is compressed, a shape thereof is in a state of being substantially consolidated, and the web W is easily transported. Thus, the diameter of the heating and pressing roller 151 that is disposed on further downstream side than the pressing roller 121 may be small. Therefore, it is possible to reduce the apparatus configuration in size. Moreover, the diameters of the heating and pressing roller 151 and the pressing roller 121 are appropriately set depending on a thickness of the web W that is manufactured and the like.

Furthermore, a member capable of coming into contact with the web W between the pressing roller 121 of the pressing unit 120 and the heating and pressing roller 151 of the heating and pressing unit 150 is only the guide 108 as the web receiving member capable of supporting the web W from below. Thus, it is possible to reduce a distance between the pressing roller 121 and the heating and pressing roller 151. In addition, since the pressed web W is quickly heated and pressed, the springback of the web W is suppressed and it is possible to form the sheet having high density and high strength.

A first cutting unit 110 is disposed on further downstream side than the heating and pressing unit 150 in the transport direction of the web W as a cutting unit for cutting the web W in a direction intersecting the transport direction of the transported web W. The first cutting unit 110 includes cutters and cuts out the continuous web W in a sheet form (sheet-like) according to a cutting position that is set in a predetermined length. In addition, a second cutting unit 130, which cuts the web W in the transport direction of the web W, is disposed on further downstream side than the first cutting unit 110 in the transport direction of the web W. The second cutting unit 130 includes cutters and cuts out (cuts) the web depending on a predetermined cutting position in the transport direction of the web W. Thus, the sheet Pr (web W) having a desired size is formed. Then, the cut sheets Pr (webs W) are stacked in a stacker 160 and the like.

As described above, according to the above-described embodiment, it is possible to obtain the following effects.

The web W is formed by depositing the fiber and resin. In this case, the web W is in a state of containing a lot of air and being soft, and inflated. Then, the web W of this state is pressed. In this case, heating is not performed. Thus, resin in the web W is not melted and the gap (distance) between the fibers is shortened. That is, the web W is densified. Then, the web W is heated and pressed in a state where the fibers are densified. Thus, resin is melted and bonded in a state where the distance between the fibers is shortened. Thus, it is possible to form the sheet Pr (web W) having high density and high strength.

Moreover, the sheet according to the embodiment mainly refers to a sheet which uses the fibers as the raw material and is formed in a sheet shape. However, the sheet is not limited to the embodiment and may be a board shape or a web shape (or a shape having unevenness). Furthermore, as the raw material, plant fibers such as cellulose, chemical fibers such as polyethylene terephthalate (PET) and polyester, and animal fibers such as wool and silk may be included. The sheet in the present application is divided into paper and non-woven fabric. Paper includes aspects formed in a thin sheet shape of which the raw material is pure pulp or waste paper and includes recording paper for writing or printing, wallpaper, wrapping paper, colored paper, Kent paper, and the like. Non-woven fabric has a thickness thicker than that of paper or has a strength lower than that of paper, and includes non-woven fabric, fiber board, tissue paper, kitchen paper, cleaner, filter, liquid absorption material, sound-absorbing material, cushioning material, mat, and the like.

In the above-described embodiment, it is possible to manufacture a thin sheet because the sheet is pressed more strongly in the pressing unit than in the heating and pressing unit in addition to having high density and high strength. This is effective in paper because the paper is thinner than the nonwoven fiber. However, it is also possible to manufacture the nonwoven fiber having high strength even if the embodiment is used in the manufacturing of the nonwoven fiber.

The invention is not limited to the above-described embodiment and various modifications and improvements can be added to the above-described embodiment. The modifications will be described later.

Modification Example 1

In the above-described embodiment, in the pressing unit 120, two of the first pressing unit 120a and the second pressing unit 120b are provided, but the invention is not limited to the configuration. For example, the pressing unit 120 may be one configuration. In addition, in the heating and pressing unit 150, two of the first heating and pressing unit 150a and the second heating and pressing unit 150b are provided, but the invention is not limited to the configuration. For example, the heating and pressing unit 150 may be one configuration. Even in this way, it is possible to obtain the same effects as the above description. In addition, it is possible to further reduce the size of the configuration of the sheet manufacturing apparatus 1.

Modification Example 2

In the above-described embodiment, the first cutting unit 110 is disposed on further downstream side than the heating and pressing unit 150 in the transport direction of the web W, but the invention is not limited to the embodiment. For example, the first cutting unit 110 may be disposed between the pressing unit 120 and the heating and pressing unit 150. Thus, the web W becomes a form of a long and sheet-shaped on further upper side in the transport direction of the web W, and a length dimension of the web w is reduced in the transport direction. Thus, it is possible to reduce occurrence of skew and the like according to the transport of the web W.

Modification Example 3

In the above-described embodiment, the supplying unit 10, the crushing unit 20, the defibrating unit 30, the classifying unit 40, and the additive agent feeding unit 60 may be omitted. If the raw material to which defibrated additive agent is added is used, those configuration elements are not necessary. Required configuration element may be added depending on a form of the using raw material.

Modification Example 4

In the present application, waste paper is mainly referred to as a printed paper, but it is regarded as waste paper regardless of whether or not used as long as the raw material is formed as paper.

REFERENCE SIGNS LIST

1 SHEET MANUFACTURING APPARATUS
10 SUPPLYING UNIT
20 CRUSHING UNIT
30 DEFIBRATING UNIT
40 CLASSIFYING UNIT
50 RECEIVING UNIT
60 ADDITIVE AGENT FEEDING UNIT
70 WEB FORMING UNIT
108 GUIDE AS WEB RECEIVING MEMBER
110 FIRST CUTTING UNIT
120 PRESSING UNIT
120a FIRST PRESSING UNIT
120b SECOND PRESSING UNIT
121 PRESSING ROLLER
122 METAL CORE
130 SECOND CUTTING UNIT
150 HEATING AND PRESSING UNIT
150a FIRST HEATING AND PRESSING UNIT
150b SECOND HEATING AND PRESSING UNIT
151 HEATING AND PRESSING ROLLER
152 METAL CORE
153 RELEASE LAYER
154 HEATING MEMBER
160 STACKER

The invention claimed is:

1. A sheet manufacturing apparatus comprising:
a web forming unit that forms a web and includes a mesh belt on which at least fiber and resin are deposited in the air;

a pressing unit that presses the web and does not include a heater, the pressing unit having at least a pair of pressing rollers to press the web by pinching the web by the pair of the rollers;

a heating and pressing unit that heats and presses the web on a further downstream side than the pressing unit in a transport direction of the web, the heating and pressing unit having at least a pair of heating and pressing rollers to heat and press the web by pinching the web by the pair of the rollers; and a web receiving member configured to support the web from below and arranged between the pressing rollers and the heating and pressing rollers, the web receiving member including a first end, a second end, and a middle portion between the first end and the second end in the transport direction of the web, the first end being arranged upstream relative to the second end and downstream relative to a nip point of the pressing rollers in the transport direction of the web, the second end being arranged upstream relative to a nip point of the heating and pressing rollers in the transport direction of the web, the web receiving member having a bent shape such that the middle portion is arranged below with respect to the first end and second end, the heating and pressing unit including a heater that heats the web such that a temperature of the web while the web is being heated and pressed by the heating and pressing unit is higher than a temperature of the web while the web is being pressed by the pressing unit, a pressing force of the pressing unit being greater than a pressing force of the heating and pressing unit, a diameter of each of the pressing rollers being greater than a diameter of each of the heating and pressing rollers.

2. The sheet manufacturing apparatus according to claim 1, wherein only the web receiving member is arranged and configured to come into contact with the web ebtween the pressing rollers and the heating and pressing rollers.

3. The sheet manufacturing apparatus according to claim 1, wherein the pressing unit presses the web without melting the resin.

4. The sheet manufacturing apparatus according to claim 1, wherein the pressing unit presses the web without heating the web.

5. The sheet manufacturing apparatus according to claim 1, wherein the resin is fusion-bondable resin.

6. The sheet manufacturing apparatus according to claim 1, wherein the heating unit of the heating and pressing unit is disposed inside of at least one of the heating and pressing rollers, or both.

7. A sheet manufacturing apparatus comprising:

a web forming unit that forms a web and includes mesh belt on which at least fiber and resin are deposited in the air;

a pressing unit that presses the web at 51 N to 306 N and does not include a heater, the pressing unit having at least a pair of pressing rollers to press the web by pinching the web by the pair of the rollers;

a heating and pressing unit that heats and presses the web on a further downstream side than the pressing unit in a transport direction of the web, the heating and pressing unit having at least a pair of heating and pressing rollers to heat and press the web by pinching the web by the pair of the rollers; and a web receiving member configured to support the web from below and arranged between the pressing rollers and the heating and pressing rollers, the web receiving member including a first end, a second end, and a middle portion between the first end and the second end in the transport direction of the web, the first end being arranged upstream relative to the second end and downstream relative to a nip point of the pressing rollers in the transport direction of the web, the second end being arranged upstream relative to a nip point of the heating and pressing rollers in the transport direction of the web, the web receiving member having a bent shape such that the middle portion is arranged below with respect to the first end and second end, the heating and pressing unit including a heater that heats the web such that a temperature of the web while the web is being heated and pressed by the heating and pressing unit is higher than a temperature of the web while the web is being pressed by the pressing unit, a diameter of each of the pressing rollers being greater than a diameter of each of the heating and pressing rollers.

* * * * *